United States Patent
Lancioni et al.

(10) Patent No.: US 12,189,770 B2
(45) Date of Patent: Jan. 7, 2025

(54) METHODS AND APPARATUS TO DETECT MALWARE USING MICRO-FORESTS WITH CUSTOMER TRUST SEEDS

(71) Applicant: McAfee, LLC, San Jose, CA (US)

(72) Inventors: German Lancioni, San Jose, CA (US); Sorcha Healy, Mahon (IE)

(73) Assignee: MCAFEE, LLC, San Jose, CA (US)

( * ) Notice: Subject to any disclaimer, the term of this patent is extended or adjusted under 35 U.S.C. 154(b) by 294 days.

(21) Appl. No.: 17/561,475

(22) Filed: Dec. 23, 2021

(65) Prior Publication Data

US 2023/0030136 A1  Feb. 2, 2023

Related U.S. Application Data

(60) Provisional application No. 63/227,305, filed on Jul. 29, 2021.

(51) Int. Cl.
   *G06F 21/56* (2013.01)
   *G06F 21/00* (2013.01)
   *G06N 7/01* (2023.01)

(52) U.S. Cl.
   CPC .......... *G06F 21/566* (2013.01); *G06F 21/56* (2013.01); *G06F 21/567* (2013.01); *G06N 7/01* (2023.01); *G06F 2221/033* (2013.01)

(58) Field of Classification Search
   CPC ........ G06F 21/566; G06F 21/50; G06F 21/55; G06F 21/56; G06F 21/561; G06F 21/562; G06F 21/564; G06F 21/567; G06F 21/568
   See application file for complete search history.

(56) References Cited

U.S. PATENT DOCUMENTS

| | | | |
|---|---|---|---|
| 8,621,626 B2 | 12/2013 | Alme | |
| 10,924,503 B1* | 2/2021 | Pereira | H04L 63/20 |
| 2013/0326625 A1 | 12/2013 | Anderson et al. | |

(Continued)

FOREIGN PATENT DOCUMENTS

CN  110991538 A  4/2020

OTHER PUBLICATIONS

United States Patent and Trademark Office, "Non-Final Office Action," issued in connection with U.S. Appl. No. 17/566,760, dated Dec. 7, 2023, 11 pages.

(Continued)

*Primary Examiner* — Edward Zee
(74) *Attorney, Agent, or Firm* — HANLEY, FLIGHT & ZIMMERMAN, LLC

(57) ABSTRACT

Methods and apparatus are disclosed to detect malware using micro-forests with customer trust seeds. A false positive correction apparatus includes processor circuitry to perform at least one of the first operations, the second operations or the third operations to instantiate classifier circuitry to access a malicious sample, the malicious sample having a first feature vector, sample comparison circuitry to compare the malicious sample to a known sample, the known sample collected from customer data, the known sample having a second feature vector, calculator circuitry to calculate a distance value between the first feature vector and the second feature vector, threshold comparator circuitry to compare the distance value to a threshold, and change the classification of the malicious sample to clean in response to the distance value satisfying the threshold.

26 Claims, 11 Drawing Sheets

(56) References Cited

U.S. PATENT DOCUMENTS

| | | |
|---|---|---|
| 2016/0098561 A1 | 4/2016 | Keller et al. |
| 2016/0132521 A1* | 5/2016 | Reininger ............. G06F 16/156 707/739 |
| 2019/0026466 A1 | 1/2019 | Krasser et al. |
| 2019/0199736 A1 | 6/2019 | Howard et al. |
| 2023/0029679 A1 | 2/2023 | Lancioni et al. |
| 2023/0030136 A1 | 2/2023 | Lancioni et al. |
| 2023/0171277 A1 | 6/2023 | Giaconi et al. |

OTHER PUBLICATIONS

United States Patent and Trademark Office, "Non-Final Office Action," issued in connection with U.S. Appl. No. 17/645,921, dated Mar. 12, 2024, 22 pages.

United States Patent and Trademark Office, "Final Office Action," issued in connection with U.S. Appl. No. 17/566,760, dated Apr. 29, 2024, 11 pages.

United States Patent and Trademark Office, "Notice of Allowance and Fee(s) Due," issued in connection with U.S. Appl. No. 17/566,760, mailed on Jun. 11, 2024, 11 pages.

* cited by examiner

US 12,189,770 B2

METHODS AND APPARATUS TO DETECT MALWARE USING MICRO-FORESTS WITH CUSTOMER TRUST SEEDS

RELATED APPLICATION

This patent claims priority to U.S. Provisional Patent Application Ser. No. 63/227,305, which was filed on Jul. 29, 2021. U.S. Provisional Patent Application No. 63/227,305 is hereby incorporated herein by reference in its entirety.

FIELD OF THE DISCLOSURE

This disclosure relates generally to malware detection and, more particularly, to methods and apparatus to detect malware using micro-forests with customer trust seeds.

BACKGROUND

Malware (e.g., viruses, spyware, malicious code, etc.) is malicious software that threatens the security of many computer and Internet users. Malware can cause significant damage to computer networks, servers, email accounts, financial accounts, etc. Malware detection is a technique to monitor the activity of such systems. Artificial intelligence and machine learning models can be utilized to enhance malware detection and, thus, system security.

BRIEF DESCRIPTION OF THE DRAWINGS

The figures are not to scale. In general, the same reference numbers will be used throughout the drawing(s) and accompanying written description to refer to the same or like parts.

Figure 1:
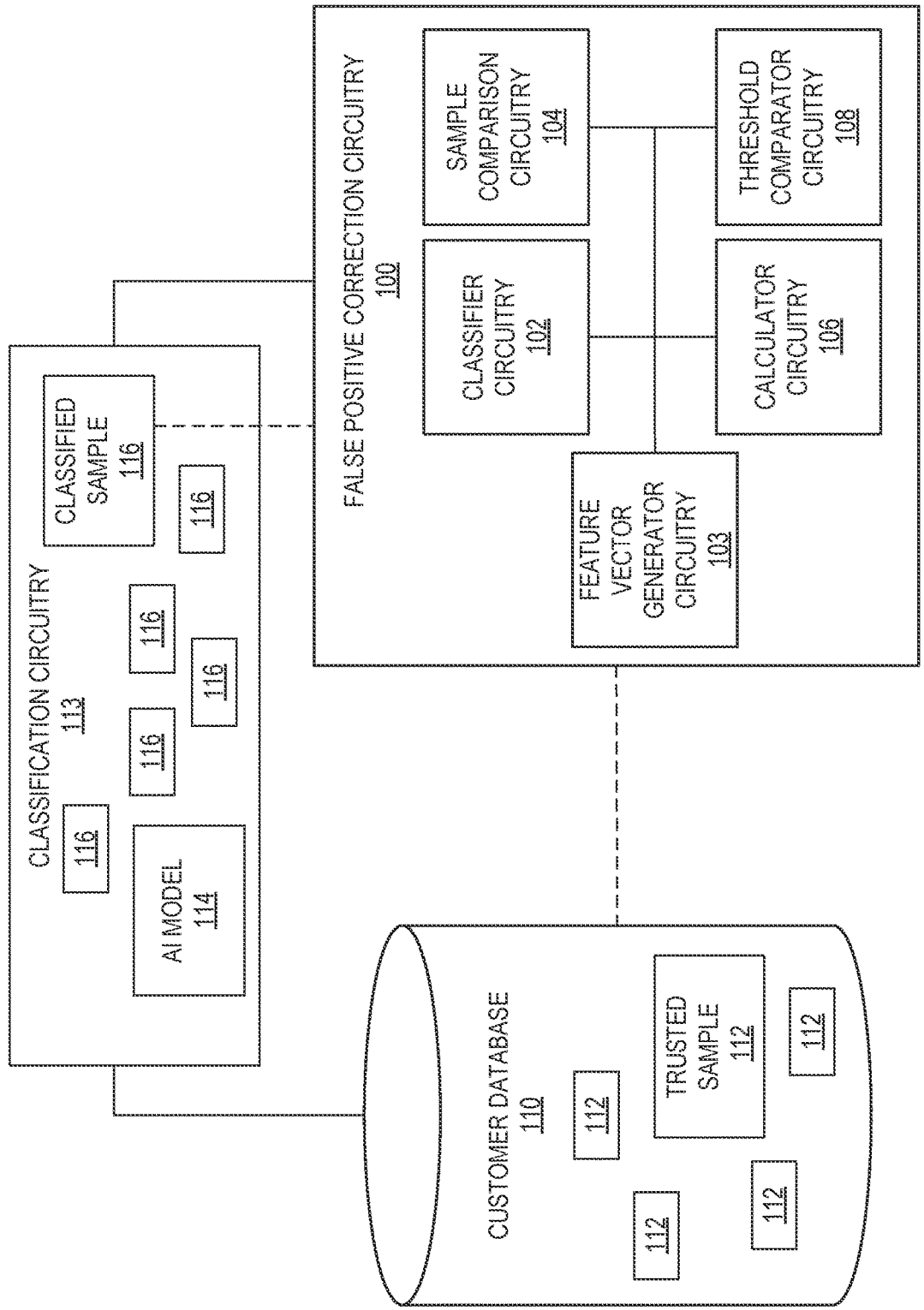
FIG. 1 is a block diagram of example false positive correction circuitry to detect malware using micro-forests with customer trust seeds.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. For example, the approximating language may refer to being within a ten percent margin.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In particular, AI solutions for malware detection aim to detect threats (e.g., viruses, malicious files, etc.), prevent potential malware and/or classify samples as clean or malicious. However, current AI solutions for malware detection are limited by high false positive rates. False positives occur when a legitimate (e.g., trusted, known, clean, etc.) file is processed as malware. High false positive rates negatively affect the accuracy of an AI/ML model, require time and money to investigate and mitigate the mistake, require manual (e.g., human) intervention, and limit the AI/ML to restrictive thresholds (e.g., detection sensitivities). Additionally, current malware detection models provide inadequate coverage when applied to different customers. As such, the models that are served with global (e.g., wide-ranging, low sensitivity, etc.) thresholds exacerbate the high false positive rate with a low threshold sensitivity.

Examples disclosed herein can be used to detect malware using AI/ML models. Further, examples disclosed herein enable AI/ML models to efficiently detect and mitigate malware without excessive rates of false positives. Examples disclosed herein utilize customer normality data (e.g., seeds, trusted samples, customer samples, etc.) to identify files (e.g., item, sample, Portable Executable files, etc.) that are non-malicious in the environment of a customer. As such, examples disclosed herein can operate on a per-customer basis by using sets of normality data that are valid to a particular customer. Examples disclosed herein compare an unknown sample (e.g., new sample) that has been classified as malware to trusted samples within a customer normality set.

While examples disclosed herein describe identification of malware in the context of positively identifying an item (e.g., a file, a request, a message, etc.) as being malicious, in some examples, such classification and/or identification may be performed in the context of identifying the item as non-malicious (e.g., benign). In this manner, while examples disclosed herein are used to identify false positives, such examples may additionally or alternatively be used to identify false negatives (e.g., a false negative that an item is non-malicious).

Examples disclosed herein utilize a feature vector to denote (e.g., index, identify, etc.) a cryptographic hash of a sample. As used herein, a cryptographic hash is data in a fixed-size output (e.g., data array, string of text, etc.) of coded text that provides unique information of the data. Examples disclosed herein compare an unknown sample's feature vector to a trusted sample's feature vector. In some examples, a distance value is calculated based on the amount of variation between the hash values of the feature vectors. For example, when comparing at least two hashes, a relatively high degree of variation (e.g., less than 95% similar hash values) produces a high distance value. However, a relatively low degree of variation (e.g., greater than 95% similar hash values) produces a low distance value. Accordingly, a malicious sample with a substantially similar hash to a trusted sample's hash (e.g., at least 95% similar), can signify that the malicious sample is actually a clean sample. Thus, a malicious sample can be a false positive and can be remediated to a clean classification.

In some examples, a micro-forest is utilized to maintain a clean normality set of customer data. Accordingly, when a customer system is updated or changed, the clean normality set can detect and predict which new samples in the customer system are updates and/or versions of the existing clean samples. In some examples, a customer identifies "known-to-be-clean" samples with corresponding clean feature vectors observed in their environments and submits the samples to their customer specific micro-forest.

FIG. 1 is a block diagram of example false positive correction circuitry 100 that can be implemented in accordance with the teachings of the present disclosure. The example false positive correction circuitry 100 of FIG. 1 includes a classifier circuitry 102, a sample comparison circuitry 104, a feature vector generator circuitry 103, a calculator circuitry 106, and a threshold comparator circuitry 108. The example false positive correction circuitry 100 accesses a customer database 110 with trusted samples 112. Additionally or alternatively, the example false positive correction circuitry 100 is in communication with classification circuitry 113 that executes an AI model 114 to produce classified samples 116. The example false positive correction circuitry 100 verifies and/or corrects a malicious classification of a classified sample 116 from the classification circuitry 113.

In examples disclosed herein, the false positive correction circuitry 100 accesses the classified sample 116 from the classification circuitry 113. In the example of FIG. 1, the classified sample 116 is classified as malware. However, the example false positive correction circuitry 100 can verify and/or correct this classification. In some examples, the classified sample 116 is malware. In other examples, the classified sample 116 is a false positive (e.g., a clean sample).

The example classifier circuitry 102 accesses the classified sample 116 (e.g., malicious sample). In some examples, the classified sample 116 has a feature vector to index (e.g., identify, describe, etc.) the sample 116.

In some examples, the classifier circuitry 102 includes means for accessing a malicious sample. For example, the means for accessing may be implemented by classifier circuitry 102. In some examples, the classifier circuitry 102 may be implemented by machine executable instructions such as that implemented by at least blocks 606 and 702 of FIGS. 6 and 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the classifier circuitry 102 is implemented by other hardware logic circuitry, hardware implemented state machines, and/or any other combination of hardware, software, and/or firmware. For example, the classifier circuitry 102 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example feature vector generator circuitry 103 creates a feature vector (e.g., hash, hash value, etc.) for the classified sample 116. In some examples, the feature vector generator circuitry 103 generates (e.g., creates) a feature vector for the trusted samples 112.

The example sample comparison circuitry 104 compares the sample 116 to a trusted sample 112. Additionally or alternatively, the feature vector of the malicious sample 116 is compared to a feature vector of the trusted sample 112. In some examples, the customer database 110 maintains a clean normality set of customer samples. Accordingly, the example customer database 110 can store updated versions of the feature vector of the trusted sample 112 based on the customer environment. Additionally or alternatively, the customer database 110 includes a locality sensitive hashing based forest of customer normality sets and/or samples.

In some examples, the sample comparison circuitry 104 includes first means for comparing the malicious sample to a known sample. For example, the first means for comparing may be implemented by sample comparison circuitry 104. In some examples, the sample comparison circuitry 104 may be implemented by machine executable instructions such as that implemented by at least blocks 608 and 704 of FIGS. 6 and 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the sample comparison circuitry 104 is implemented by other hardware logic circuitry, hardware implemented state machines, and/or any other combination of hardware, software, and/or firmware. For example, the sample comparison circuitry 104 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example calculator circuitry 106 calculates a distance value between the feature vector of malicious sample 116 and the feature vector of the trusted sample 112. In some examples, the distance value denotes a degree of variation between the feature vectors. For example, the distance value is a sum of the variations between the hash values (e.g., hash strings, Boolean numericals, Boolean values) of the malicious sample 116 and the trusted sample 112. The variations can include sub-distance between the hash strings, differing values within the hash strings, differing sequence of values within the hash strings, sub-distance between numeric values, etc. In some examples, the distance value is a percentage of the trusted sample 112 that corresponds to (e.g., matches, is similar too, etc.) the malicious sample 116.

In some examples, the calculator circuitry 106 includes means for calculating a distance value between the first feature vector and the second feature vector. For example, the means for calculating may be implemented by calculator circuitry 106. In some examples, the calculator circuitry 106 may be implemented by machine executable instructions such as that implemented by at least blocks 610 and 706 of FIGS. 6 and 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the calculator circuitry 106 is implemented by other hardware logic circuitry, hardware implemented state machines, and/or any other combination of hardware, software, and/or firmware. For example, the calculator circuitry 106 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

The example threshold comparator circuitry 108 compares the distance value to a threshold. In some examples, the threshold determines whether the malicious sample 116 is a false positive. In some examples, a distance value of at least 95% (e.g., the feature vectors are at least 95% similar), satisfies the threshold. However, any other threshold value may additionally or alternatively be used. In such examples, the malicious sample 116 is considered a false positive when the distance value meets or exceeds the threshold. The example threshold comparator circuitry 108 changes the identification of the malicious sample 116 to an identification of a clean sample. However, if the distance value does not satisfy (e.g., does not exceed) the threshold, the threshold comparator circuitry 108 verifies the malicious sample 116 as malware.

In some examples, the threshold comparator circuitry 108 includes second means for comparing to compare the distance value to a threshold and change the malicious sample to a clean sample in response to the distance value satisfying a threshold. For example, the second means for comparing may be implemented by threshold comparator circuitry 108. In some examples, the threshold comparator circuitry 108 may be implemented by machine executable instructions such as that implemented by at least blocks 612, 614, 616, 708, 710, and 712 of FIGS. 6 and 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the threshold comparator circuitry 108 is implemented by other hardware logic circuitry, hardware implemented state machines, and/or any other combination of hardware, software, and/or firmware. For example, the threshold comparator circuitry 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the second means for comparing includes means for verifying the malicious sample in response to the distance value exceeding the threshold. For example, the means for verifying may be implemented by threshold comparator circuitry 108. In some examples, the threshold comparator circuitry 108 may be implemented by machine executable instructions such as that implemented by at least blocks 614 and 710 of FIGS. 6 and 7 executed by processor circuitry, which may be implemented by the example processor circuitry 812 of FIG. 8, the example processor circuitry 900 of FIG. 9, and/or the example Field Programmable Gate Array (FPGA) circuitry 1000 of FIG. 10. In other examples, the threshold comparator circuitry 108 is implemented by other hardware logic circuitry, hardware implemented state machines, and/or any other combination of hardware, software, and/or firmware. For example, the threshold comparator circuitry 108 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 2:
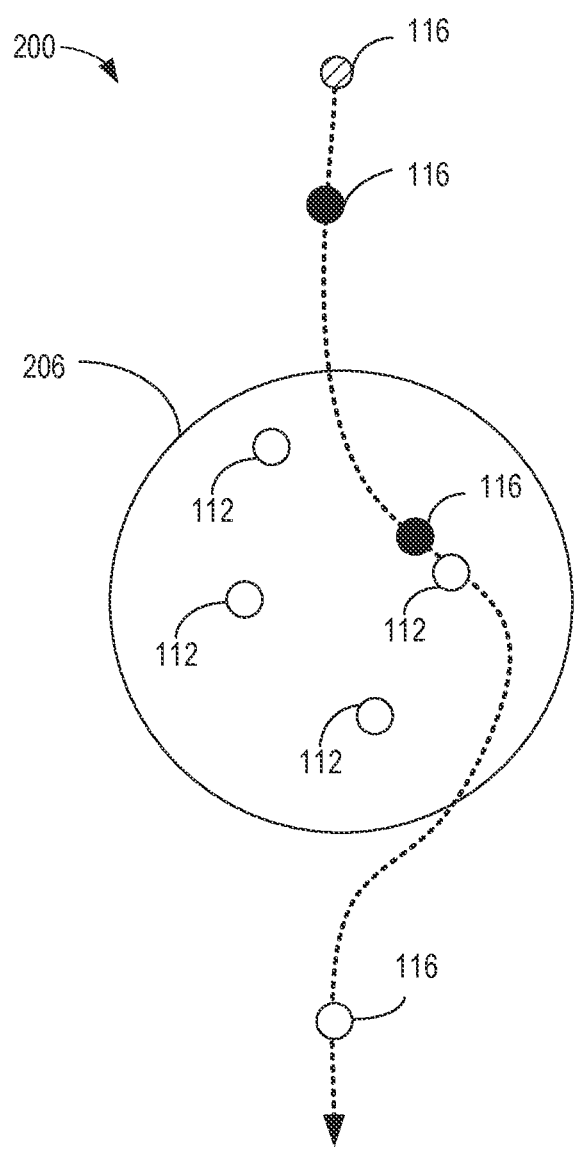
FIG. 2 is a diagram of an example sample classification that can be implemented using example approaches disclosed herein.

FIG. 2 is a diagram of an example sample classification 200 that can be implemented in accordance with the teachings of the present disclosure. The example sample classification 200 demonstrates the false positive correction circuitry 100 of FIG. 1. In FIG. 2, the sample classification 200 determines whether the sample 116 is malicious or clean. In response to the AI model 114 classifying the sample 116 as malware, the sample 116 is analyzed within a customer specific micro-forest 206 (e.g., locality sensitive hashing based forest) of customer normality data. The example customer specific micro-forest 206 is defined (e.g., maintained) by the customer database 110 and includes trusted samples 112. In some examples, a customer can submit clean samples 112 into the customer specific micro-forest 206.

The sample 116 is compared to the trusted samples 112. In particular, a feature vector of the sample 116 is compared to a feature vector of the trusted samples 112. For example, the sample 116 is compared to the trusted sample 112 to calculate variations and/or similarities (e.g., a distance value) between the samples 116 and 112. In FIG. 2, the classification 200 determines that the sample 116 is substantially similar to the trusted samples 112. For example, the distance value calculation of the samples 116 and 112 satisfies a threshold set by the classification 200 and/or the false positive correction circuitry 100. Thus, the sample 116 is a false positive and the classification is changed from malware to clean (e.g., trusted).

Figure 3:
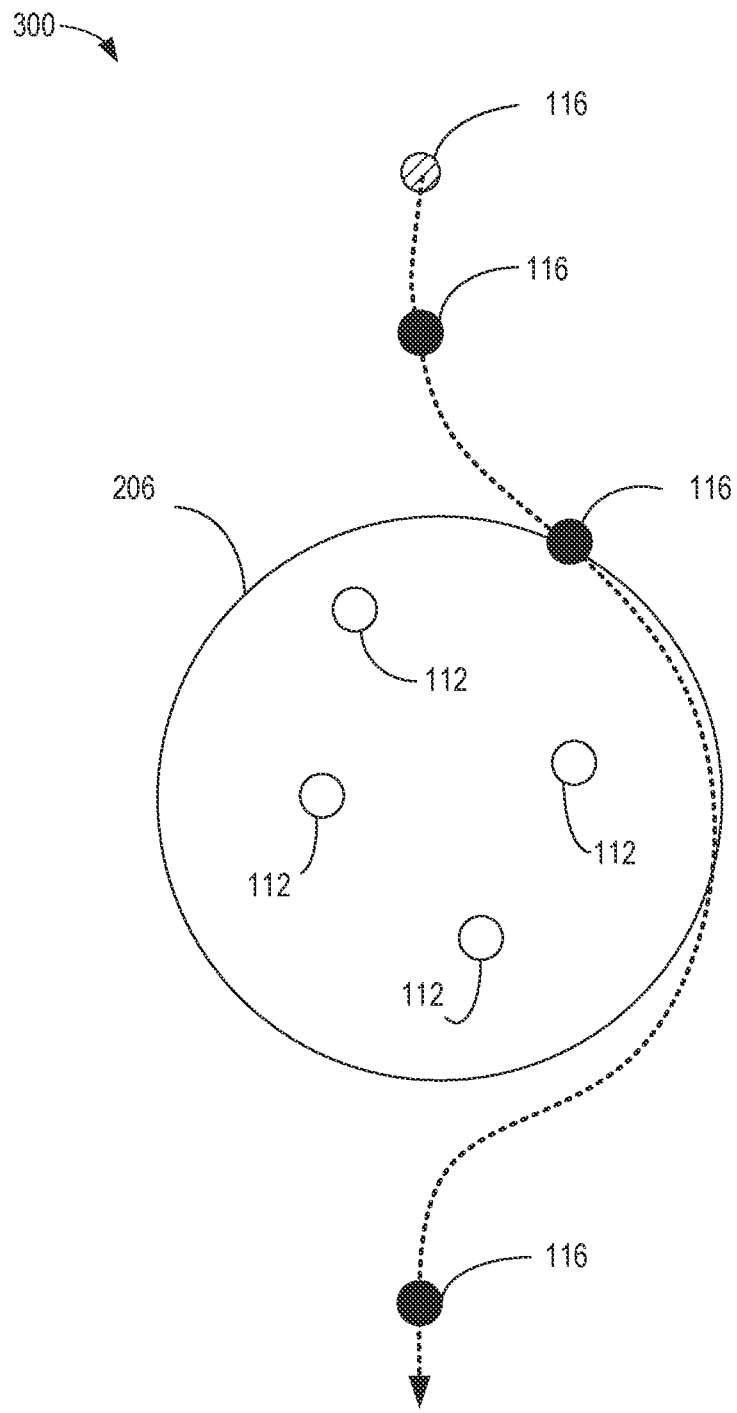
FIG. 3 is a diagram of another example sample classification that can be implemented using example approaches disclosed herein.

FIG. 3 is a diagram of an example sample classification 300 that can be implemented in accordance with the teachings of the present disclosure. The example sample classification 300 of FIG. 3 is similar to the sample classification 200 of FIG. 2, but, instead, the sample 116 is verified as malware (e.g., not a false positive). In FIG. 3, the classification 300 determines that the sample 116 is substantially different (e.g., includes a high degree of variation) from the trusted samples 112. For example, the distance value calculation of the feature vectors of the samples 116 and 112 exceeds a threshold set by the classification 300 and/or the false positive correction circuitry 100.

Figure 4:
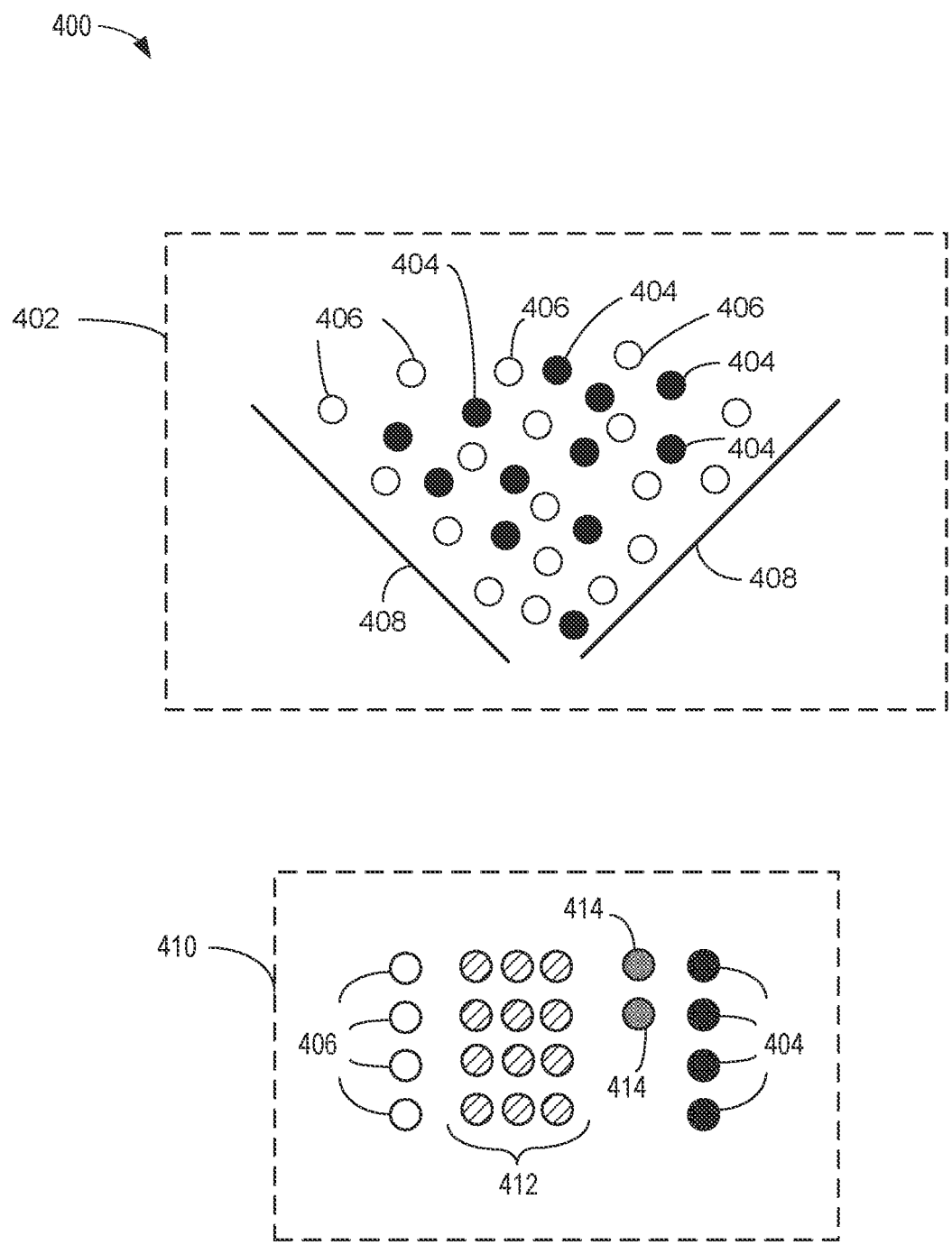
FIG. 4 illustrates an example existing approach for classifying samples as false positives.

FIG. 4 illustrates an example existing approach for classifying samples as false positives. The example diagram 400 begins at block 402 as malicious samples 404 and clean samples 406 are analyzed to determine their classification as clean and/or malicious. For example, at block 402, the samples 404, 406 are analyzed to identify false positives based on limits 408 that provide calculation. Based on those limits, at block 410, the samples 404, 406 are categorized as clean samples 406, unknown samples 412, false positives 414, and malicious samples 404.

Figure 5:
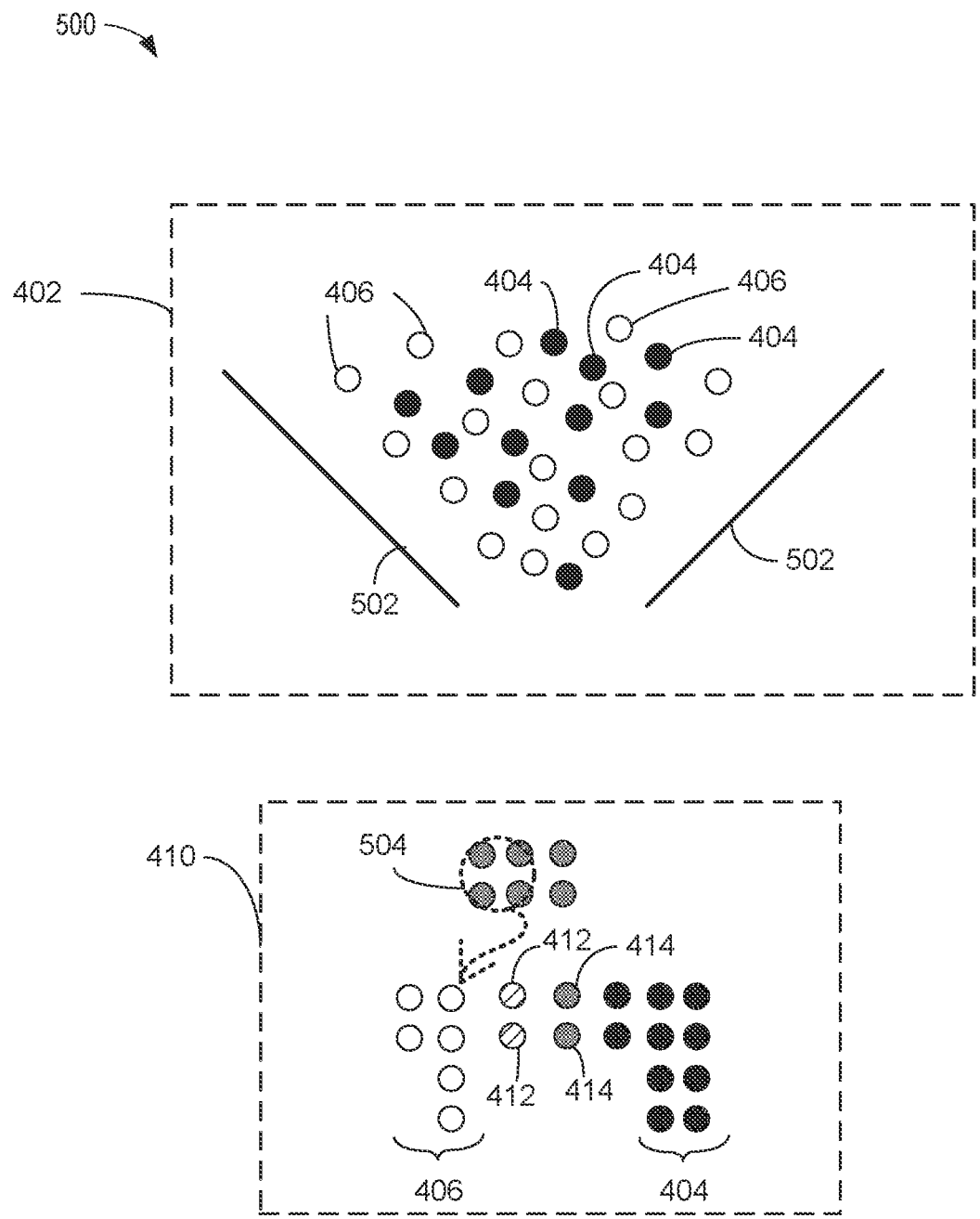
FIG. 5 illustrates an example approach that can be implemented in examples disclosed herein.

FIG. 5 is a diagram of an example approach that can be implemented in accordance with the teachings of the present disclosure. An example implementation 500 of FIG. 5 is similar to the example of FIG. 4, but, instead, the limits 502 of FIG. 5 depict a less restrictive threshold compared to the limits 408. Additionally or alternatively, at block 410, false positives 414 represented by group 504 are analyzed by the false positive correction circuitry 100 of FIG. 1. As such, the samples 414 in the group 504 are false positives 414 that are remediated to be identified as clean samples 406. In the illustrated example of FIG. 5, the classification performed by the false positive correction circuitry 100 of FIG. 1 permits the use of less sensitive (e.g., less restrictive) limits 502.

While an example manner of implementing the false positive correction circuitry 100 is illustrated in FIG. 1, one or more of the elements, processes, and/or devices illustrated in FIG. 1 may be combined, divided, re-arranged, omitted, eliminated, and/or implemented in any other way. Further, the example classifier circuitry 102, the example sample comparison circuitry 104, the example calculator circuitry 106, the threshold comparator circuitry 108 and/or, more generally, the example false positive correction circuitry 100 of FIG. 1, may be implemented by hardware alone or by hardware in combination with software and/or firmware. Thus, for example, any of the example classifier circuitry 102, the example sample comparison circuitry 104, the example calculator circuitry 106, the threshold comparator circuitry 108 and/or, more generally, the example false positive correction circuitry 100, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example false positive correction circuitry 100 of FIG. 1 may include one or more elements, processes, and/or devices in addition to, or instead of, those illustrated in FIG. 1, and/or may include more than one of any or all of the illustrated elements, processes and devices.

Figure 6:
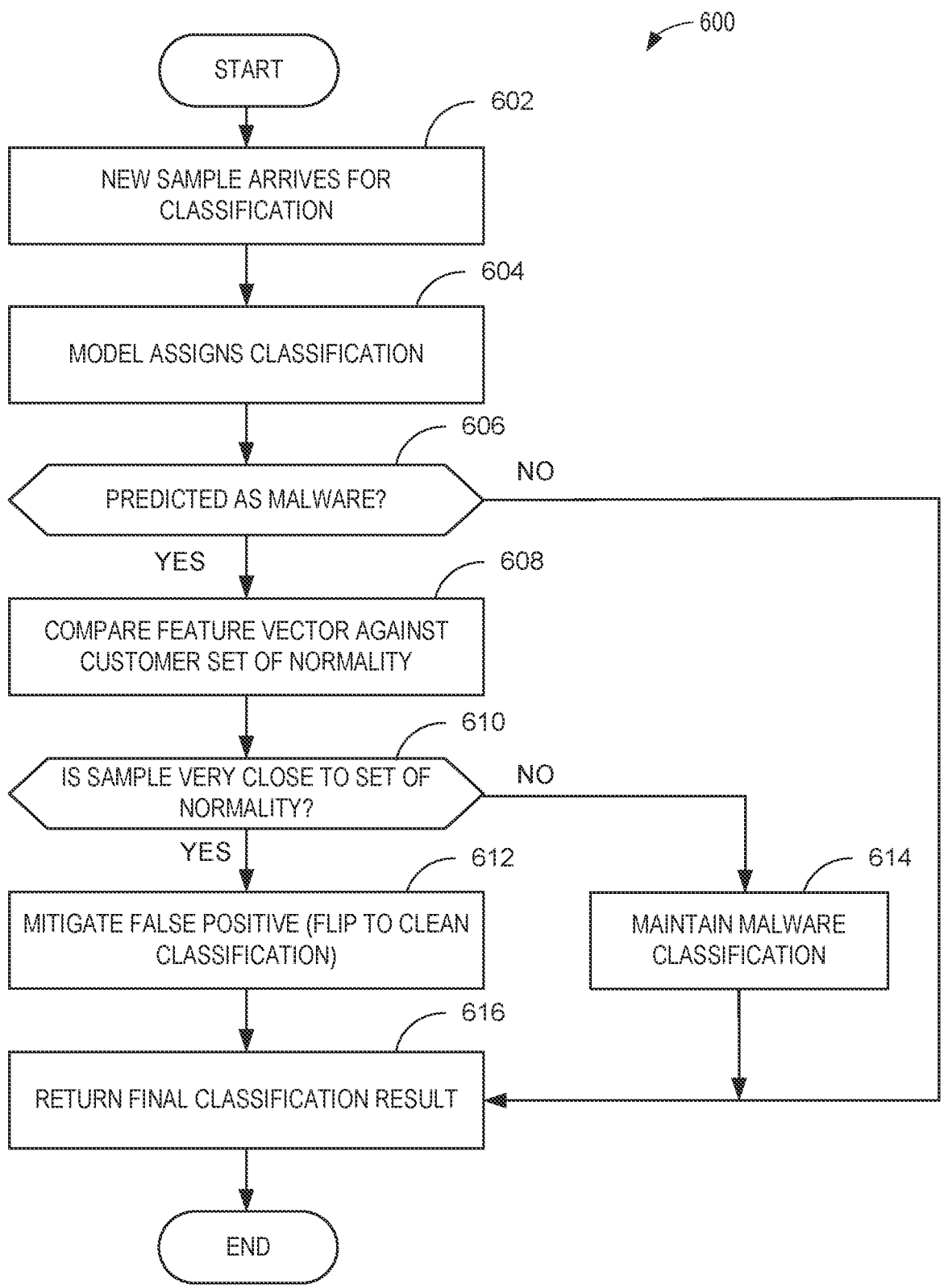
FIG. 6 is a flowchart representative of example machine readable instructions that may be executed by example processor circuitry to implement the example false positive correction circuitry of FIG. 1.
Figure 7:
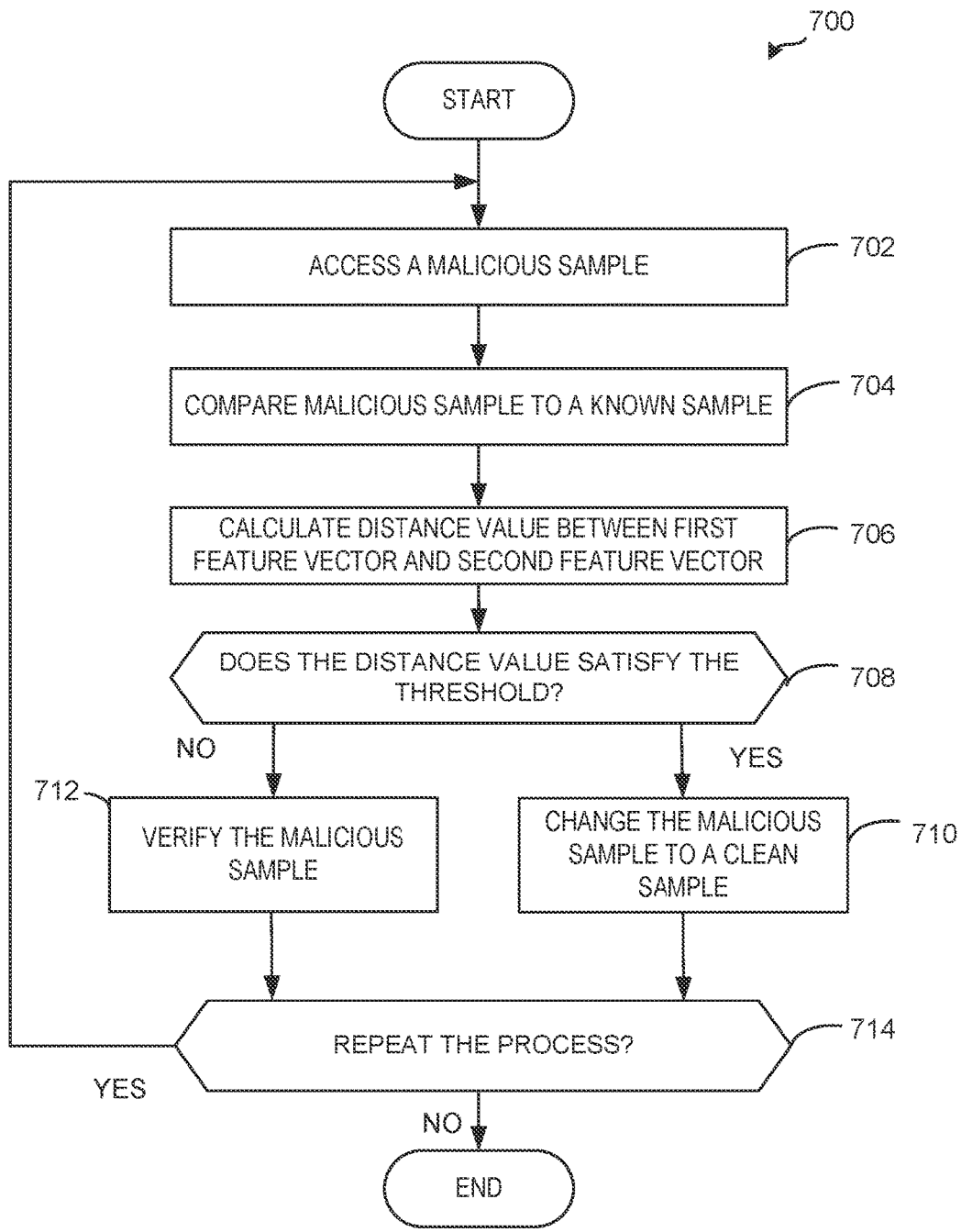
FIG. 7 is another flowchart representative of example machine readable instructions that may be executed by example processor circuitry to implement the example false positive correction circuitry of FIG. 1.

Flowcharts representative of example hardware logic circuitry, machine readable instructions, hardware implemented state machines, and/or any combination thereof for implementing the false positive correction circuitry 100 is shown in FIGS. 6 and 7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6 and 7, many other methods of implementing the example false positive correction circuitry 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages. C, C++, Java. C#, Perl, Python, JavaScript, HyperText Markup Language (HTML), Structured Query Language (SQL), Swift, etc.

As mentioned above, the example operations of FIGS. 6 and 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C. (6) B with C, or (7) A with B and with C. As used herein in the context of describing structures, components, items, objects and/or things, the phrase "at least one of A and B" is intended to refer to implementations including any of (1) at least one A, (2) at least one B. or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"). "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to implement the false positive correction circuitry 100 of FIG. 1. The machine readable instructions and/or operations 600 of FIG. 6 begin at block 602, at which the AI model 114 accesses a new sample 116 for classification.

At block 604, the classification circuitry 113 assigns a classification to the new sample 116. In some examples, the classification is clean (e.g., trusted) or malicious (e.g., malware). In some examples, the classification circuitry 113 executes the AI model 114 to classify the sample 116.

At block 606, it is determined by the classifier circuitry 102 whether the sample 116 was predicted as malware. If the sample 116 is predicted as malware (block 606), the process continues to block 608. Otherwise, the process continues to block 616.

At block 608, the sample comparison circuitry 104 compares the feature vector (e.g., hash) against a customer set of normality. In some examples, the customer database 110 maintains a customer specific micro-forest 206 that includes the customer set of normality.

At block 610, it is determined by the calculator circuitry 106 and/or the threshold comparator circuitry 108 whether the sample 116 is very close to the customer set of normality. In some examples, the sample 116 that is very close (e.g., low degree of variation) to the customer set of normality satisfies a threshold determined by the false positive correction circuitry 100. In other examples, the sample 116 that is very different (e.g., high degree of variation) from the customer set of normality exceeds a threshold determined by the false positive correction circuitry 100. If the sample 116 is very close to the set of normality (block 610), the process continues to block 612. Otherwise, the process continues to block 614.

At block 612, the threshold comparator circuitry 108 changes the classification from malicious to clean. Thus, the threshold comparator circuitry 108 mitigates the false positive.

At block 614, the threshold comparator circuitry 108 maintains the malicious classification of the sample 116.

At block 616, the threshold comparator circuitry 108 returns the final classification result. In some examples, the sample 116 is verified as a malicious sample. In other examples, the sample 116 is a clean sample (e.g., corrected false positive).

FIG. 7 is a flowchart representative of example machine readable instructions and/or example operations 700 that may be executed and/or instantiated by processor circuitry to implement the false positive correction circuitry 100 of FIG. 1. The machine readable instructions and/or operations 700 of FIG. 7 begin at block 702, at which the classifier circuitry 102 accesses a malicious sample 116.

At block 704, the sample comparison circuitry 104 compares the malicious sample 116 to a known sample with a clean classification. In some examples, the known sample is a trusted sample 112 within a customer database 110. In some examples, the malicious sample 116 includes a first feature vector and the trusted sample 112 includes a second feature vector. In some examples, the feature vector generator circuitry generates the feature vectors of the malicious sample 116 and the trusted sample 112.

At block 706, the calculator circuitry 106 calculates a distance value between the first feature vector and the second feature vector of the sample 116 and 112, respectively. In some examples, the distance value is a sum of the different characteristics between the hashes of the malicious sample 116 and the trusted sample 112.

At block 708, the threshold comparator circuitry 108 determines whether the distance value satisfies the threshold. If the threshold is satisfied (708), the process continues to block 710. If the thresholds is not satisfied (e.g., exceeds the threshold) (708), the process continues to block 712. In some examples, the false positive correction circuitry 100 and/or the AI model 114 determines the threshold. For example, the threshold can set a minimum percentage of the trusted sample 112 to correspond to (e.g., match) the malicious sample 116. In some examples, the distance value exceeds the threshold. However, the distance value can satisfy the threshold.

At block 710, the threshold comparator circuitry 108 changes the malicious classification of the sample 116 to a clean classification in response to the distance value satisfying the threshold.

At block 712, the threshold comparator circuitry 108 verifies the malicious classification of the sample 116 in response to the distance value exceeding (e.g., not satisfying) the threshold.

At block 714, it is determined whether to repeat the process. If the process is to be repeated (block 714), control of the process returns to block 702. Otherwise, the process ends. This determination may be based on whether additional samples 116 are to be classified and/or corrected by the false positive correction circuitry 100.

Figure 8:
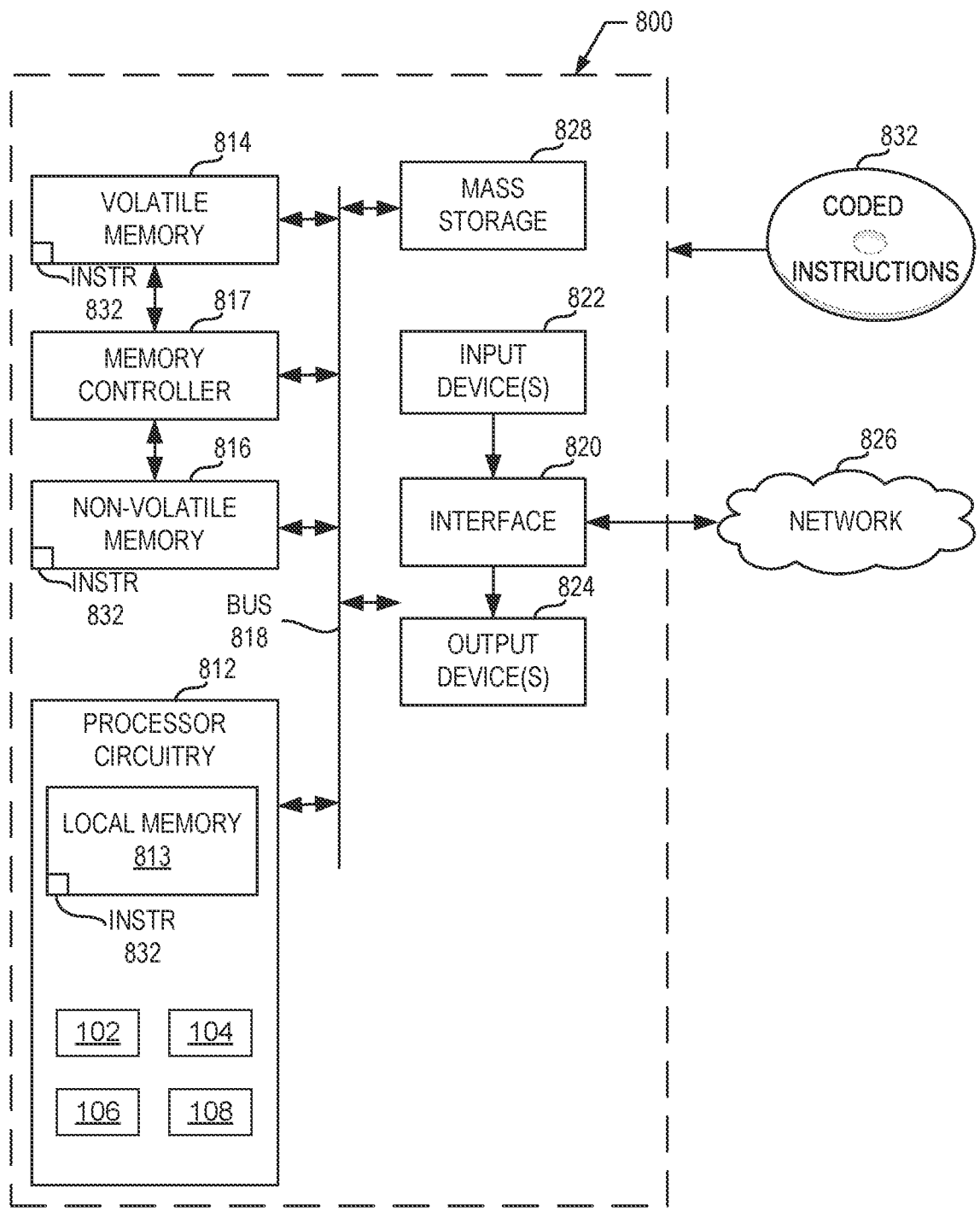
FIG. 8 is a block diagram of an example processing platform including processor circuitry structured to execute the example machine readable instructions of FIGS. 6 and 7 to implement the example false positive correction circuitry of FIG. 1.

FIG. 8 is a block diagram of an example processor platform 800 structured to execute and/or instantiate the machine readable instructions and/or operations of FIGS. 6 and 8 to implement the false positive correction circuitry of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example classifier circuitry 102, the example sample comparison circuitry 104, the calculator circuitry 106, and the threshold comparator circuitry 108.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812.

One or more output devices 824 are also connected to the interface circuitry 820 of the illustrated example. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives. HDDs. CDs, Blu-ray disk drives, redundant array of independent disks (RAID) systems, solid state storage devices such as flash memory devices, and DVD drives.

The machine executable instructions 832, which may be implemented by the machine readable instructions of FIGS. 6 and 7, may be stored in the mass storage device 828, in the volatile memory 814, in the non-volatile memory 816, and/or on a removable non-transitory computer readable storage medium such as a CD or DVD.

Figure 9:
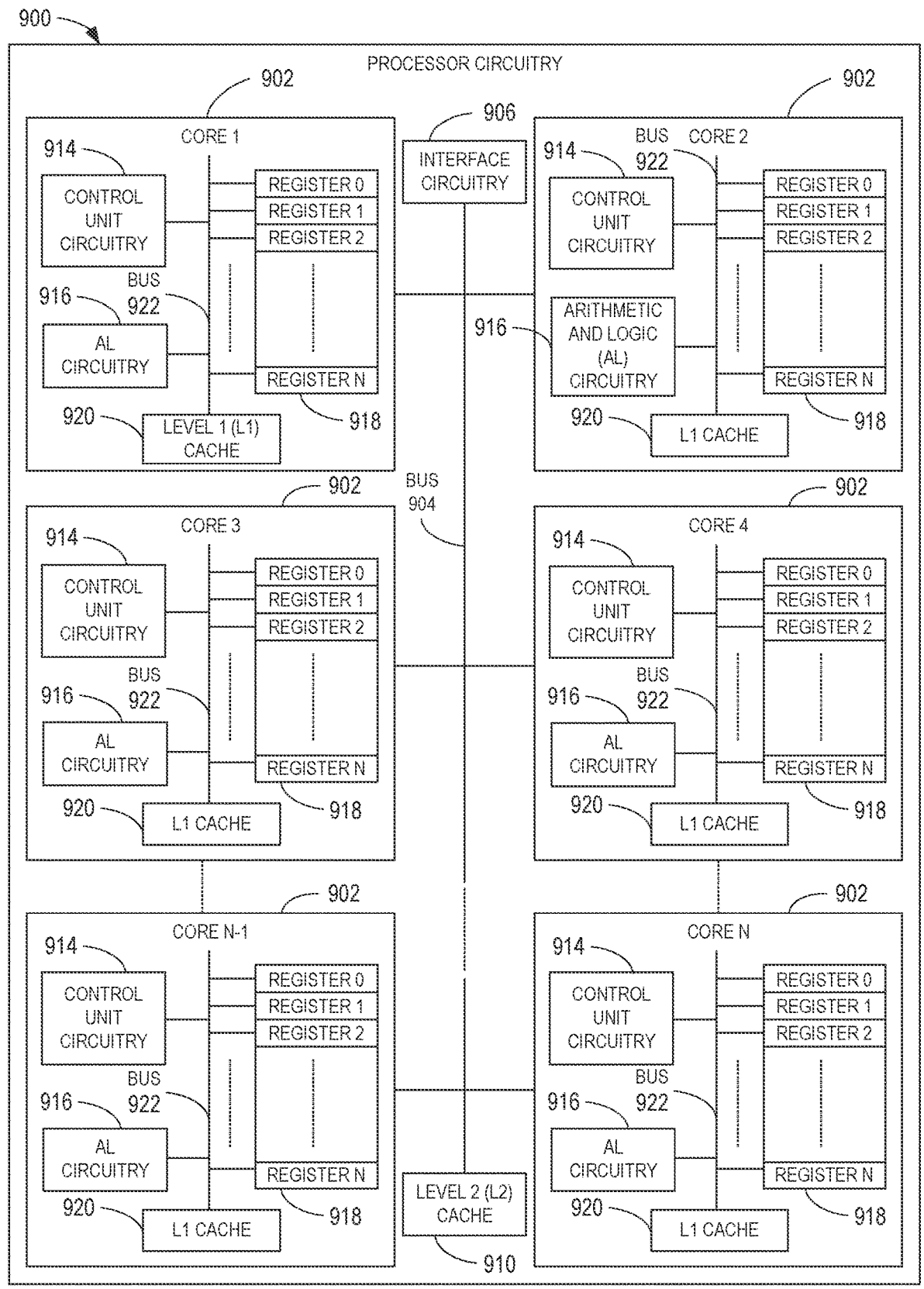
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 6 and 7.

The cores 902 may communicate by an example bus 904. In some examples, the bus 904 may implement a communication bus to effectuate communication associated with one(s) of the cores 902. For example, the bus 904 may implement at least one of an Inter-Integrated Circuit (I2C) bus, a Serial Peripheral Interface (SPI) bus, a PCI bus, or a PCIe bus. Additionally or alternatively, the bus 904 may implement any other type of computing or electrical bus.

The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the L1 cache 920, and an example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The bus 922 may implement at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
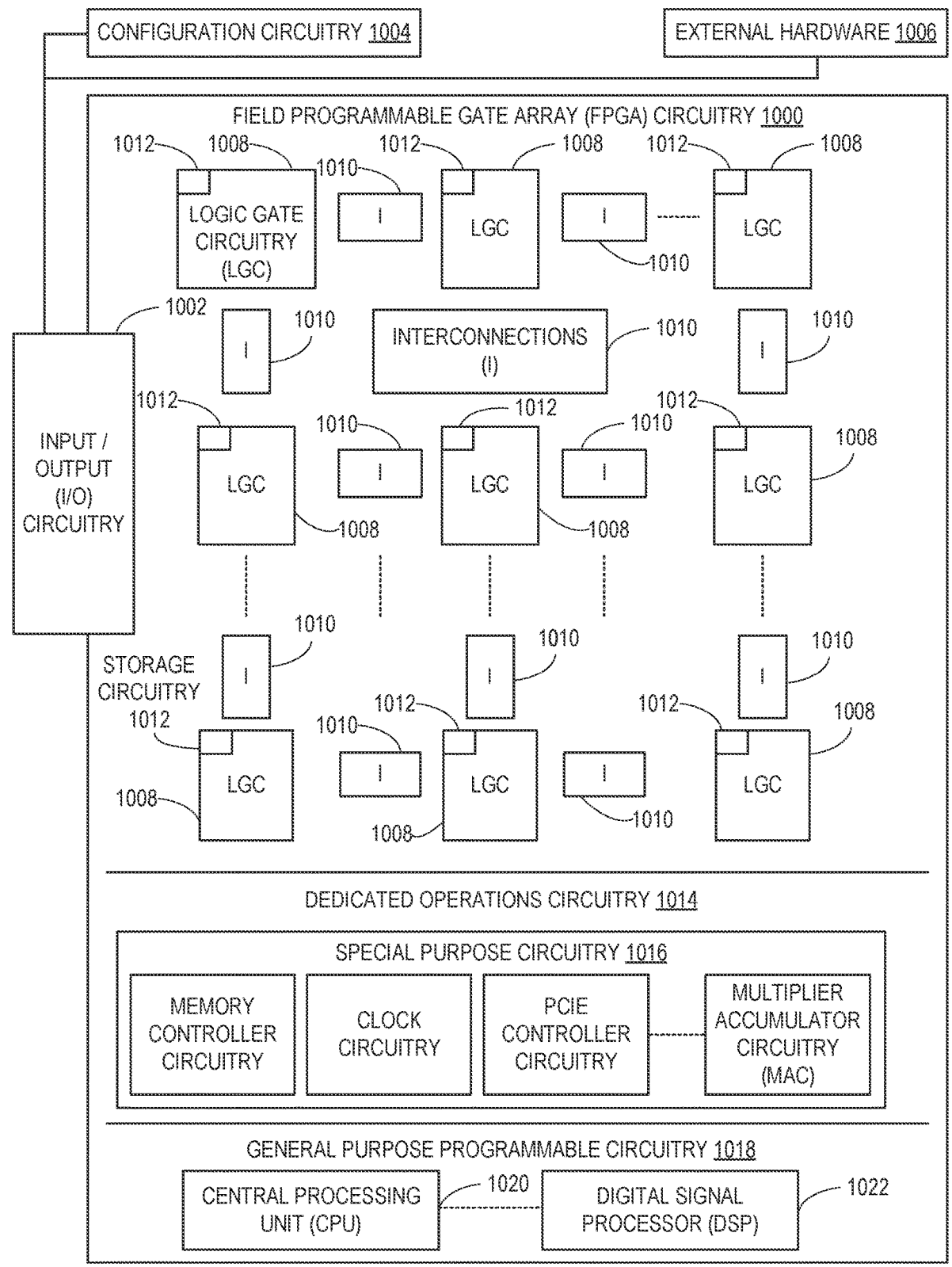
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 6 and 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowchart of FIGS. 6 and 7. In particular, the FPGA 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 6 and 7. As such, the FPGA circuitry 1000 may be structured to effectively instantiate some or all of the machine readable instructions of the flowcharts of FIGS. 6 and 7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIG. 10 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware (e.g., external hardware circuitry) 1006. For example, the configuration circuitry 1004 may implement interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed, or dedicated circuitry) that may implement an Artificial Intelligence/Machine Learning (AI/ML) model to generate the instructions), etc. In some examples, the external hardware 1006 may implement the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and interconnections 1010 are configurable to instantiate one or more operations that may correspond to at least some of the machine readable instructions of FIG. 10 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 6 and 7 may be executed by one or more of the cores 902 of FIG. and a second portion of the machine readable instructions represented by the flowcharts of FIGS. 6 and 7 may be executed by the FPGA circuitry 1000 of FIG. 10.

In some examples, the processor circuitry 812 of FIG. 8 may be in one or more packages. For example, the processor circuitry 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
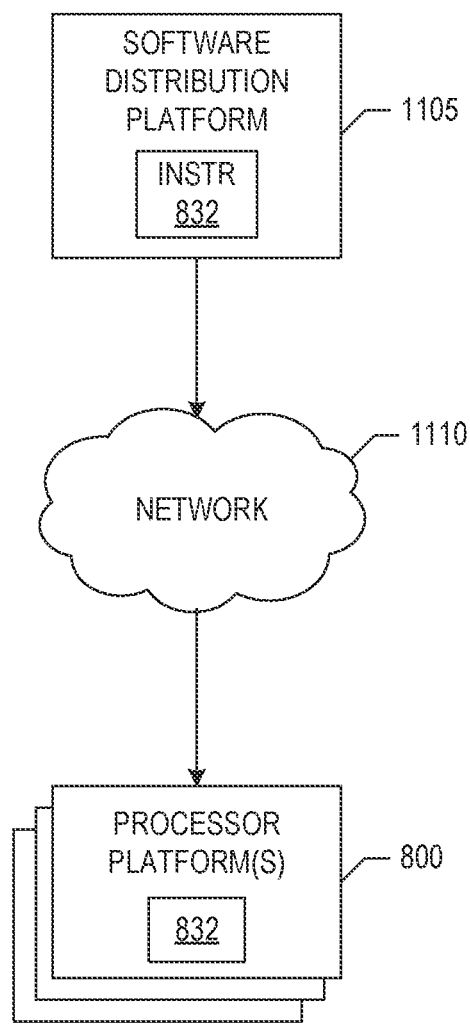
FIG. 11 is a block diagram of an example software distribution platform (e.g., one or more servers) to distribute software (e.g., software corresponding to the example machine readable instructions of FIGS. 6 and 7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 600 and 700 of FIGS. 6 and 7, as described above. The one or more servers of the example software distribution platform 1105 are in communication with a network 1110, which may correspond to any one or more of the Internet and/or the example network 826 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 600 and 700 of FIGS. 6 and 7, may be downloaded to the example processor platform 800, which is to execute the machine readable instructions 832 to implement the false positive correction circuitry 100. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example methods and apparatus have been disclosed that increase malware detection capabilities using micro-forests with customer trust seeds. The disclosed examples improve the efficiency of an AI model by reducing the false positive rates during malware classification and by allowing for less sensitive thresholds for classifying samples in a customer environment. Additionally or alternatively, the need for human and/or manual intervention to correct false positives is reduced such that an AI model operate at optimal efficiency and accuracy. Thus, examples disclosed herein provide an AI model with enhanced rates of malware detection. The disclosed methods and apparatus are accordingly directed to one or more improvement(s) in the operation of a machine such as a computer or other electronic and/or mechanical device.

Further examples and combinations thereof include the following:

Example 1 includes a false positive correction apparatus comprising memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate classifier circuitry to access a malicious sample, the malicious sample having a first feature vector, sample comparison circuitry to compare the malicious sample to a known sample, the known sample collected from customer data, the known sample having a second feature vector, calculator circuitry to calculate a distance value between the first feature vector and the second feature vector, threshold comparator circuitry to compare the distance value to a threshold, and change a classification of the malicious sample to clean in response to the distance value satisfying the threshold.

Example 2 includes the apparatus of example 1, wherein the threshold comparator circuitry is to verify the malicious sample in response to the distance value exceeding the threshold.

Example 3 includes the apparatus of example 1, wherein the malicious sample is a false positive.

Example 4 includes the apparatus of example 1, wherein the known sample includes a Portable Executable file on a customer system.

Example 5 includes the apparatus of example 1, wherein the customer data includes a locality sensitive hashing based forest of customer normality samples, the customer normality samples including clean samples.

Example 6 includes the apparatus of example 1, wherein the distance value is at least one of a sub-distance between Boolean values, a sub-distance between numeric values, or a sub-distance between strings.

Example 7 includes the apparatus of example 1, wherein the threshold is a percentage of the first feature vector.

Example 8 includes the apparatus of example 7, wherein second feature vector is at least 95 percent similar to the first feature vector, the second feature vector satisfying the threshold.

Example 9 includes a method, comprising accessing a malicious sample, the malicious sample having a first feature vector, comparing the malicious sample to a known sample, the known sample collected from customer data, the known sample having a second feature vector, calculating a distance value between the first feature vector and the second feature vector, comparing the distance value to a threshold, and changing a classification of the malicious sample to clean in response to the distance value satisfying the threshold.

Example 10 includes the method of example 9, further including verifying the malicious sample in response to the distance value exceeding the threshold.

Example 11 includes the method of example 9, wherein the malicious sample is a false positive.

Example 12 includes the method of example 9, wherein the known sample includes a Portable Executable file on a customer system.

Example 13 includes the method of example 9, wherein the customer data includes a locality sensitive hashing based forest of customer normality samples, the customer normality samples including clean samples.

Example 14 includes the method of example 9, wherein the distance value is at least one of a sub-distance between Boolean values, a sub-distance between numeric values, or a sub-distance between strings.

Example 15 includes the method of example 9, wherein the threshold is a percentage of the first feature vector.

Example 16 includes the method of example 9, wherein second feature vector is at least 95 percent similar to the first feature vector, the second feature vector satisfying the threshold.

Example 17 includes an apparatus comprising means for accessing a malicious sample, the malicious sample having a first feature vector, first means for comparing the malicious sample to a known sample, the known sample collected from customer data, the known sample having a second feature vector, means for calculating a distance value between the first feature vector and the second feature vector, second means for comparing to compare the distance value to a threshold, and change a classification of the malicious sample to clean in response to the distance value satisfying the threshold.

Example 18 includes the apparatus of example 17, wherein the second means for comparing includes a means for verifying the malicious sample in response to the distance value exceeding the threshold.

Example 19 includes the apparatus of example 17, wherein the malicious sample is a false positive.

Example 20 includes the apparatus of example 17, wherein the known sample includes a Portable Executable file on a customer system.

Example 21 includes the apparatus of example 17, wherein the customer data includes a locality sensitive hashing based forest of customer normality samples, the customer normality samples including clean samples.

Example 22 includes the apparatus of example 17, wherein the distance value is at least one of a sub-distance between Boolean values, a sub-distance between numeric values, or a sub-distance between strings.

Example 23 includes the apparatus of example 17, wherein the threshold is a percentage of the first feature vector.

Example 24 includes the apparatus of example 23, wherein second feature vector is at least 95 percent similar to the first feature vector, the second feature vector satisfying the threshold.

Example 25 includes a non-transitory computer readable storage medium comprising instructions which, when executed, cause one or more processors to at least access a malicious sample, the malicious sample having a first feature vector, compare the malicious sample to a known sample, the known sample collected from customer data, the known sample having a second feature vector, calculate a distance value between the first feature vector and the second feature vector, compare the distance value to a threshold, and change a classification of the malicious sample to clean in response to the distance value satisfying the threshold.

Example 26 includes the computer readable storage medium of example 25, wherein the instructions cause the one or more processors to verify the malicious sample in response to the distance value exceeding the threshold.

Example 27 includes the computer readable storage medium of example 25, wherein the malicious sample is a false positive.

Example 28 includes the computer readable storage medium of example 25, wherein the known sample includes a Portable Executable file on a customer system.

Example 29 includes the computer readable storage medium of example 25, wherein the customer data includes a locality sensitive hashing based forest of customer normality samples, the customer normality samples including clean samples.

Example 30 includes the computer readable storage medium of example 25, wherein the distance value is at least one of a sub-distance between Boolean values, a sub-distance between numeric values, or a sub-distance between strings.

Example 31 includes the computer readable storage medium of example 25, wherein the threshold is a percentage of the first feature vector.

Example 32 includes the computer readable storage medium of example 25, wherein second feature vector is at least 95 percent similar to the first feature vector, the second feature vector satisfying the threshold.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:
1. A false positive correction apparatus comprising:
   memory; and
   processor circuitry including one or more of:
   at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
   a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or
   Application Specific Integrated Circuit (ASIC) including logic gate circuitry to perform one or more third operations;

the processor circuitry to perform at least one of the first operations, the second operations or the third operations to instantiate:
classifier circuitry to access a malicious sample, the malicious sample having a first feature vector;
sample comparison circuitry to compare, using a machine learning algorithm, the malicious sample to a known sample, the known sample collected from customer normality samples, the known sample having a second feature vector, the machine learning algorithm trained based on the customer normality samples, the customer normality samples including clean samples;
calculator circuitry to calculate a distance value between the first feature vector and the second feature vector; and
threshold comparator circuitry to:
compare the distance value to a threshold; and
change a classification of the malicious sample to clean in response to the distance value satisfying the threshold.

2. The apparatus of claim 1, wherein the threshold comparator circuitry is to verify the malicious sample in response to the distance value exceeding the threshold.

3. The apparatus of claim 1, wherein the malicious sample is a false positive.

4. The apparatus of claim 1, wherein the known sample includes a Portable Executable file on a customer system.

5. The apparatus of claim 1, wherein the machine learning algorithm is a locality sensitive hashing based forest of the customer normality samples.

6. The apparatus of claim 1, wherein the distance value is at least one of a sub-distance between Boolean values, a sub-distance between numeric values, or a sub-distance between strings.

7. The apparatus of claim 1, wherein the threshold is a percentage of the first feature vector.

8. The apparatus of claim 7, wherein the second feature vector is at least 95 percent similar to the first feature vector, the second feature vector satisfying the threshold.

9. The apparatus of claim 1, wherein the threshold comparator circuitry is to:
determine that the malicious sample is a changed clean sample when the classification is changed from malicious to clean; and
enable transmission of the changed clean sample to a customer database, the customer database storing the customer normality samples.

10. A method, comprising:
accessing a malicious sample, the malicious sample having a first feature vector;
comparing, using a machine learning algorithm, the malicious sample to a known sample, the known sample collected from customer normality samples, the known sample having a second feature vector, the machine learning algorithm trained based on the customer normality samples, the customer normality samples including clean samples;
calculating a distance value between the first feature vector and the second feature vector;
comparing the distance value to a threshold; and
changing a classification of the malicious sample to clean in response to the distance value satisfying the threshold.

11. The method of claim 10, further including verifying the malicious sample in response to the distance value exceeding the threshold.

12. The method of claim 10, wherein the malicious sample is a false positive.

13. The method of claim 10, wherein the known sample includes a Portable Executable file on a customer system.

14. The method of claim 10, wherein the machine learning algorithm is a locality sensitive hashing based forest of the customer normality samples.

15. The method of claim 10, wherein the distance value is at least one of a sub-distance between Boolean values, a sub-distance between numeric values, or a sub-distance between strings.

16. The method of claim 10, wherein the threshold is a percentage of the first feature vector.

17. The method of claim 10, wherein the second feature vector is at least 95 percent similar to the first feature vector, the second feature vector satisfying the threshold.

18. A non-transitory computer readable storage medium comprising instructions which, when executed, cause one or more processors to at least:
access a malicious sample, the malicious sample having a first feature vector;
compare, using a machine learning algorithm, the malicious sample to a known sample, the known sample collected from customer normality samples, the known sample having a second feature vector, the machine learning algorithm trained based on the customer normality samples, the customer normality samples including clean samples;
calculate a distance value between the first feature vector and the second feature vector;
compare the distance value to a threshold; and
change a classification of the malicious sample to clean in response to the distance value satisfying the threshold.

19. The computer readable storage medium of claim 18, wherein the instructions cause the one or more processors to verify the malicious sample in response to the distance value exceeding the threshold.

20. The computer readable storage medium of claim 18, wherein the malicious sample is a false positive.

21. The computer readable storage medium of claim 18, wherein the machine learning algorithm, is a locality sensitive hashing based forest of the customer normality samples.

22. An apparatus comprising:
means for accessing a malicious sample, the malicious sample having a first feature vector;
first means for comparing, using a machine learning algorithm, the malicious sample to a known sample, the known sample collected from customer normality samples, the known sample having a second feature vector, the machine learning algorithm trained based on the customer normality samples, the customer normality samples including clean samples;
means for calculating a distance value between the first feature vector and the second feature vector; and
second means for comparing to:
compare the distance value to a threshold; and
change a classification of the malicious sample to clean in response to the distance value satisfying the threshold.

23. The apparatus of claim 22, wherein the second means for comparing includes a means for verifying the malicious sample in response to the distance value exceeding the threshold.

24. The apparatus of claim 22, wherein the machine learning algorithm is a locality sensitive hashing based forest of the customer normality samples.

25. The apparatus of claim 22, wherein the distance value is at least one of a sub-distance between Boolean values, a sub-distance between numeric values, or a sub-distance between strings.

26. The apparatus of claim 22, wherein the threshold is a percentage of the first feature vector.

\* \* \* \* \*